United States Patent
Nielsen

(10) Patent No.: US 11,578,694 B2
(45) Date of Patent: Feb. 14, 2023

(54) WIND TURBINE ROTOR BLADE LEADING-EDGE PROTECTOR

(71) Applicant: Siemens Gamesa Renewable Energy A/S, Brande (DK)

(72) Inventor: Mogens Nielsen, Aalborg (DK)

(73) Assignee: SIEMENS GAMESA RENEWABLE ENERGY A/S, Brande (DK)

(*) Notice: Subject to any disclaimer, the term of this patent is extended or adjusted under 35 U.S.C. 154(b) by 0 days.

(21) Appl. No.: 17/163,700

(22) Filed: Feb. 1, 2021

(65) Prior Publication Data

US 2021/0310459 A1 Oct. 7, 2021

(30) Foreign Application Priority Data

Feb. 12, 2020 (EP) .................................. 20156881

(51) Int. Cl.
*F03D 1/06* (2006.01)

(52) U.S. Cl.
CPC ......... *F03D 1/0675* (2013.01); *F03D 1/0633* (2013.01); *F05B 2240/303* (2020.08); *F05B 2240/306* (2020.08); *F05B 2250/292* (2013.01); *F05B 2260/30* (2013.01); *F05B 2280/4003* (2013.01); *F05B 2280/4004* (2013.01)

(58) Field of Classification Search
CPC . F03D 1/0675; F03D 1/0633; F05B 2240/303
See application file for complete search history.

(56) References Cited

U.S. PATENT DOCUMENTS

| 2011/0206534 A1* | 8/2011 | Riahi ................... F03D 1/0675 416/241 R |
| 2012/0034094 A1* | 2/2012 | Wansink ............ B29D 99/0025 416/230 |
| 2015/0322791 A1* | 11/2015 | Flach ...................... F04D 29/18 416/223 R |
| 2016/0348643 A1* | 12/2016 | Fujioka ...................... F03D 9/25 |
| 2021/0164436 A1* | 6/2021 | Kratmann ............... F03D 80/00 |
| 2021/0180562 A1* | 6/2021 | Hertel Nilsson Van Kalken ........ F03D 1/0633 |
| 2021/0207576 A1* | 7/2021 | Larsen .................. F03D 1/0675 |

(Continued)

FOREIGN PATENT DOCUMENTS

| EP | 2811156 A1 | 12/2014 |
| EP | 3536947 A1 | 9/2019 |
| EP | 3567243 A1 | 11/2019 |

(Continued)

OTHER PUBLICATIONS

European Search Report and Written Opinion of the European Searching Authority dated Jul. 21, 2020 for Application No. 20156881.3.

*Primary Examiner* — Aaron R Eastman
(74) *Attorney, Agent, or Firm* — Schmeiser, Olsen & Watts LLP

(57) ABSTRACT

Provided is a leading-edge protector for a wind turbine rotor blade, including a curved body shaped for attachment to the rotor blade along at least a section of its leading edge; a plurality of fins, each fin extending radially outward from the curved body and terminating in a blunt outer face; and a plurality of reinforcement bands, wherein a reinforcement band is attached to the blunt outer face of a fin. Also provided is a method of manufacturing such a leading-edge protector.

15 Claims, 4 Drawing Sheets

(56) References Cited

U.S. PATENT DOCUMENTS

2021/0215140 A1\* 7/2021 Kratmann ............... F03D 80/00

FOREIGN PATENT DOCUMENTS

| WO | WO 2016075619 A1 | 5/2016 |
| --- | --- | --- |
| WO | WO 2018060297 A1 | 4/2018 |
| WO | WO 2018060298 A1 | 4/2018 |
| WO | WO 2018149970 A1 | 8/2018 |
| WO | WO 2019115372 A1 | 6/2019 |
| WO | WO 2019233715 A1 | 12/2019 |
| WO | WO 2020069890 A1 | 4/2020 |

\* cited by examiner

WIND TURBINE ROTOR BLADE LEADING-EDGE PROTECTOR

CROSS-REFERENCE TO RELATED APPLICATIONS

This application claims priority to European Application No. 20156881.3, having a filing date of Feb. 12, 2020, the entire contents of which are hereby incorporated by reference.

FIELD OF TECHNOLOGY

The following describes a leading-edge protector for a wind turbine rotor blade.

BACKGROUND

The force of impact by airborne particles of ice, sand, etc. travelling at a high relative velocity can lead to damage, particularly along the leading edge of the rotor blade. Damage by such particles may manifest as scratches, gouges, pits or dents in the surface of the rotor blade. Any such damage at the outer surface or skin of the rotor blade can be compounded later on, for example water may collect in the pits or scratches at the surface, and cracks may develop when the water expands as it freezes. Such faults in turn can lead to catastrophic damage in the event of a lightning strike to the rotor blade. The structural damage may be so severe that the rotor blade needs to be repaired. Such maintenance work results in downtime of the wind turbine and further reduces the annual energy output.

Furthermore, pits or scratches in the otherwise smooth rotor blade will reduce the aerodynamic performance of the rotor blade, and may have a noticeable negative effect on the annual energy output of the wind turbine.

To protect the leading edge of a wind turbine rotor blade from impact and erosion damage, it is known to attach a protective cover along the leading edge. The protective cover can be shaped to lie over the leading edge and to extend some distance into the suction side and pressure side of the rotor blade. Such a protective cover can be made of a polymer and may be formed directly on the rotor blade (for example by pouring a liquid polymer into place and allowing this to cure). Alternatively a protective cover may be formed as a separate body that is mounted onto the rotor blade.

However, such a protective cover essentially suffers the damage that would otherwise have been inflicted on the rotor blade. This means that while a protective cover can help to avoid maintenance downtime by preventing structural damage to the rotor blade, it cannot prevent the reduction or worsening of aerodynamic performance. This is because any pits or cracks in the protective cover will have the same negative effect on the aerodynamic performance of the rotor blade.

SUMMARY

An aspect relates to an improved leading edge protection for the rotor blades of a wind turbine.

According to embodiments of the invention, the leading-edge protector for a wind turbine rotor blade comprises a curved body shaped for attachment to the rotor blade along at least a section of its leading edge; a plurality of essentially parallel arc-shaped fins or protrusions, each fin extending essentially radially outward from the curved body and terminating in a blunt outer face; and a plurality of reinforcement bands, wherein a reinforcement band is attached to the blunt outer face of a fin.

An advantage of the inventive leading-edge protector (LEP) is that the outwardly protruding fins can significantly reduce the extent of erosion or impact damage. Because a fin extends radially outward from the curved body, it shall be understood to have steep side walls. Because of their steep side walls, the presence of the fins increases the likelihood of a particle impacting at an obtuse angle. When a particle such as a sand grain or a hailstone impacts the leading edge reinforcement at an obtuse angle, it will most likely be deflected, thereby losing momentum. If the deflected particle does make contact with the leading edge, any such impact will be without any significant force. In this way, the fins of the inventive leading-edge protector can significantly reduce erosion or impact damage to the leading edge.

Another advantage of the inventive leading-edge protector is that any exposed or vulnerable regions are given additional protection by the reinforcement bands. In this context, an exposed or vulnerable region is a region in which a particle can impact the leading edge reinforcement at an angle close to the normal, i.e. perpendicular to the surface or at a very acute angle. At such a trajectory, the force of impact is greatest. In the inventive leading-edge protector, any such regions are protected from damage by the reinforcement bands.

The inventive leading-edge protector can therefore significantly reduce maintenance-related downtime. Furthermore, the inventive leading-edge protector can effectively reduce the extent by which the aerodynamic performance of the rotor blade is affected by erosion damage and impact damage.

According to embodiments of the invention, the method of manufacturing such a leading-edge protector comprises the steps of forming a curved body for attachment to a wind turbine rotor blade along at least a section of its leading edge; forming a plurality of fins to extend radially outward from the curved body, each fin terminating in a blunt outer face; and attaching a plurality of reinforcement bands to the blunt outer faces of the fins.

The aerodynamic rotor of a wind turbine generally comprises a number of rotor blades (usually three) mounted to a hub. The purpose of the aerodynamic rotor is to turn a generator component. A rotor blade generally comprises a root end for mounting to the hub, and an airfoil portion that is shaped to generate lift. The airfoil portion is usually shaped to have a pressure side and a suction side, and tapers to a flat tip at the outermost end of the rotor blade. The pressure side and suction side meet at the rounded leading edge (LE) and at the (usually) tapered trailing edge (TE). Since the leading edge is foremost as the rotor blade moves through the air, it is most prone to erosion and impact damage as described in the introduction.

In the following, it may be assumed that the curved body of the inventive LEP is shaped to extend onto the suction side of the rotor blade and onto the pressure side of the rotor blade. For example, the curved body may extend into the suction side or pressure side by a short distance, terminating slightly beyond the greatest thickness of the airfoil. The shape of a fin may be understood to follow the curved shape of the LEP, i.e. when viewed from the side, a fin is essentially arc-shaped.

A fin of the inventive LEP comprises two side faces, each side face extending from the curved body towards the blunt outer face. A side face of a fin is preferably essentially planar, and may meet the curved body in a gradual transition.

As indicated above, the side walls of a fin are steep, i.e. highly slanted. The angle subtended by a side face to the normal preferably comprises at most 30°, or at most 20°, or at most 10°. In an extreme embodiment, the side walls of a fin may be more steeply inclined, approaching the vertical. Equally, it may be acceptable to have an angle of inclination that is greater than 30°, i.e. the side walls of a fin rise less steeply. It is also not a requirement that the opposite side walls of a fin to have the same angle of inclination.

In embodiments of the invention, the fins protrude significantly outward from the curved body, i.e. the ratio of fin height to fin width is at least 3:1, or at least 4:1, or at least 5:1. In other words, the height of a fin exceeds its width by a factor of at least 3, or by a factor of at least 4, or by a factor of at least 5. With this "tall and slim" form, the fins can effectively deflect a large proportion of the incoming impact particles. The fins may also have the effect of reducing the noise of the aerodynamic rotor.

In embodiments of the invention, a reinforcement band is shaped as a continuation of the side faces of a fin. For example, the inclined surface of the side wall of a fin can continue into a sloping outside face of the reinforcement band, so that the cross-section of a fin with its reinforcement band has an overall parabolic shape. Basically, a reinforcement band is preferably shaped to only present steeply sloping faces to the incoming airflow. In this way, the force of impact of any airborne particle is greatly reduced.

A reinforcement band mounted to the outer blunt face of a fin is referred to as an "outer reinforcement band" in the following. The effect of the fins and outer reinforcement bands is to increase the lifetime of the LEP and the rotor blade.

A fin comprises tapered outer ends or tips, so that the two tapered outer ends of a fin transition or segue into the curved body on the suction side and the pressure side of the LEP. A fin of the inventive LEP can be shaped in such a way that, when the LEP is attached to the rotor blade, the tip-to-tip span of a fin does not exceed the maximum thickness of the airfoil.

The fins can be spaced apart by any suitable distance. For example, an embodiment of the inventive LEP may be realized with 10-15 fins per meter, each fin having a mean width in the order of 2-5 cm. Fin spacing and fin dimensions need not be regular, i.e. the mean fin width, fin height and fin spacing can vary according to the position of the LEP along the rotor blade. Appropriate dimensions of an embodiment of the inventive LEP 1 may be identified for a specific rotor blade type with the help of simulations, wind tunnel testing techniques, etc.

The negative space between adjacent fins has the shape of a narrow and deep valley. The shape of the fins can therefore result in an increased airflow with higher velocity and pressure along the bottom of such a "valley". This concentrated airflow can act as a cushion to carry deflected airborne particles safely over the leading edge of the rotor blade. However, some particles may still follow a trajectory directly towards the "valley floor". Therefore, in embodiments of the invention, the LEP also comprises a plurality of inner reinforcement bands, wherein an inner reinforcement band is arranged at the base of the "valley" between two adjacent fins and shaped to extend along the curved body of the LEP.

The inventive LEP can be manufactured from any suitable material. In embodiments of the invention, the curved body and the fins may be molded as a single part, and may be made of a suitable material. Since the curved body should fit closely about the leading edge of the rotor blade, it is preferably made of a material such as an elastomer. An example of a suitable material may be a polyurethane based elastomer.

Alternatively, the fins may be prepared separately, and may be made of a rigid material such as a hard polymer, and these fins may be partially embedded in a curved body made of a different material such as a polyurethane based elastomer as described above.

The reinforcement bands are preferably made of a stiff material that is able to withstand repeated direct impact of airborne particles such as sand, hailstones, sleet, etc. In embodiments of the invention, the reinforcement bands are made of a thermoplastic material such as a polycarbonate plastic.

The materials from which the inventive LEP is made may be chosen according to the prevailing environmental conditions at the installation site of the wind turbine on which they will be used.

The LEP can extend along the entire leading edge of a rotor blade (i.e. along the entire length of the rotor blade) or along at least a large fraction of the airfoil portion. For example, a wind turbine can comprise three rotor blades, each having a root end and an airfoil portion. The rotational velocity of a point along a wind turbine rotor blade increases with increasing distance from the root. This means that the force of impact of airborne particles also increases with increasing distance from the root. Therefore, the inventive LEP can be of great benefit in the outer region of a rotor blade. In embodiments of the invention, therefore, each rotor blade may be equipped with an embodiment of the inventive LEP to extend along the outermost 20%, or the outermost 30%, or the outermost 40% of the rotor blade length. For example, a rotor blade with a length of 80 m is preferably equipped with an embodiment of the inventive LEP at least over the last 16 m of its length, terminating at the tip end of the blade. A conventional LEP may be used in the more inward regions of the rotor blade. The extent of the LEP may be chosen according to the prevailing environmental conditions at the installation site.

As explained above, the reinforcement bands are attached to the blunt faces of the fins, and/or to the channels between fins. The reinforcement bands can be mounted in a number of ways. In embodiments of the invention, the LEP is manufactured to comprise a number of recesses along the blunt face of a fin and/or along the curved body in the channel formed between adjacent fins.

A recess can be a simple hole such as a circular bore, and is preferably shaped to receive a corresponding stud extending from the underside of a reinforcement band to complete a press stud fastener. To attach such a reinforcement band, it is sufficient to apply pressure onto the reinforcement band to press the studs into the recesses or openings. The advantage of a press-stud realization is that a reinforcement band can be quickly attached, and can equally quickly be removed (simply by pulling the reinforcement band away from the curved body or fin). Alternatively or in addition, the reinforcement band could be attached by fasteners such as screws, pins, or bolts.

BRIEF DESCRIPTION

Some of the embodiments will be described in detail, with references to the following Figures, wherein like designations denote like members, wherein.

DETAILED DESCRIPTION

Figure 1:
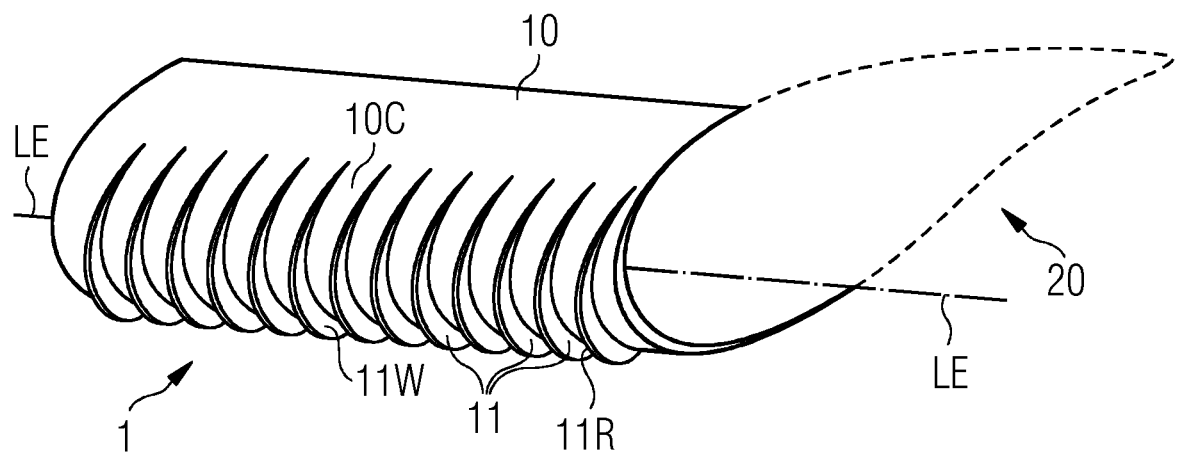
FIG. 1 shows an embodiment of a leading edge protector.
Figure 2:
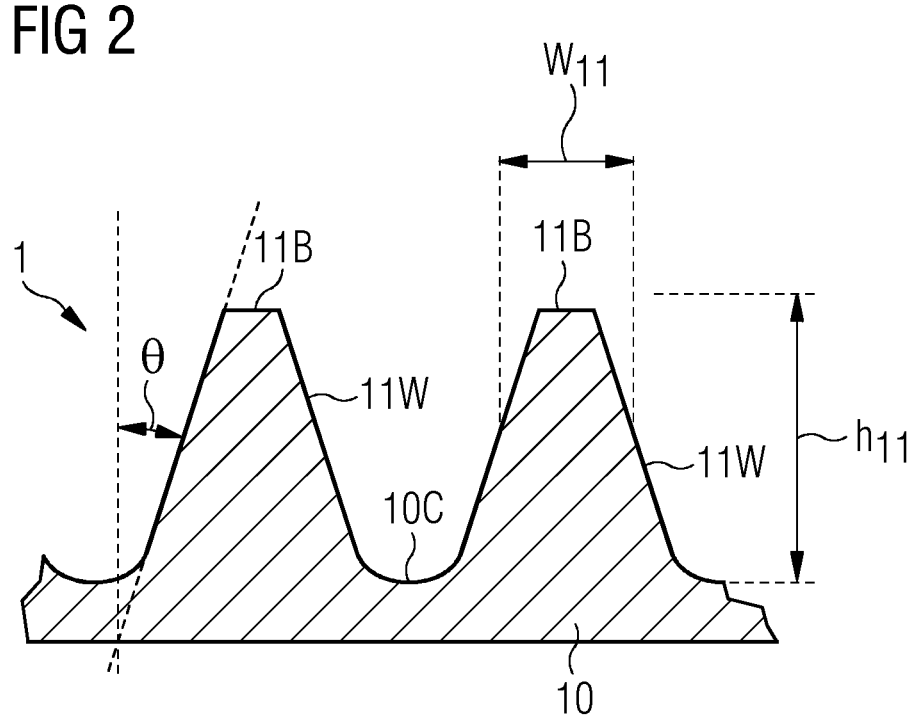
FIG. 2 shows an embodiment of the leading edge protector.

FIG. 1 shows an embodiment of the inventive LEP 1 in relation to a wind turbine rotor blade 20 to which it will be mounted. The LEP 1 is mounted along the LE of the rotor blade 20, i.e. as a shield about the region in which the pressure side meets the suction side. The inventive LEP 1 comprises a curved body 10 that is shaped to lie on the rotor blade 2 on either side of the leading edge LE. In this embodiment, a row of essentially identical fins 11 is shown. Each fin 11 protrudes from the curved body 10. Each fin 11 is essentially arc-shaped, and has a blunt outer face to which an outer reinforcement band 11R is mounted. The walls 11W or side faces of the fins 11 are steeply sloped, i.e. the height h11 of a fin 11 is significantly greater than its mean width w11 as indicated in FIG. 2, which shows a cross-section through the LEP 1, taken through a plane defined by the leading edge LE and its normal. This diagram also shows that the side walls 11W of a fin 11 subtend a steep angle θ relative to the normal extending outward from the rotor blade surface. FIG. 2 shows the LEP 1 in a partially assembled state, before outer reinforcement bands have been attached to the blunt or flat outer faces 11B of the fins 11, and before inner reinforcement bands have been attached to the valleys 10C between fins 11. Complete assemblies are shown in FIG. 4 and FIG. 5, in which each fin 11 is topped with an outer reinforcement band 11R and each "valley" 10C is lined with an inner reinforcement band 10R.

Figure 3:
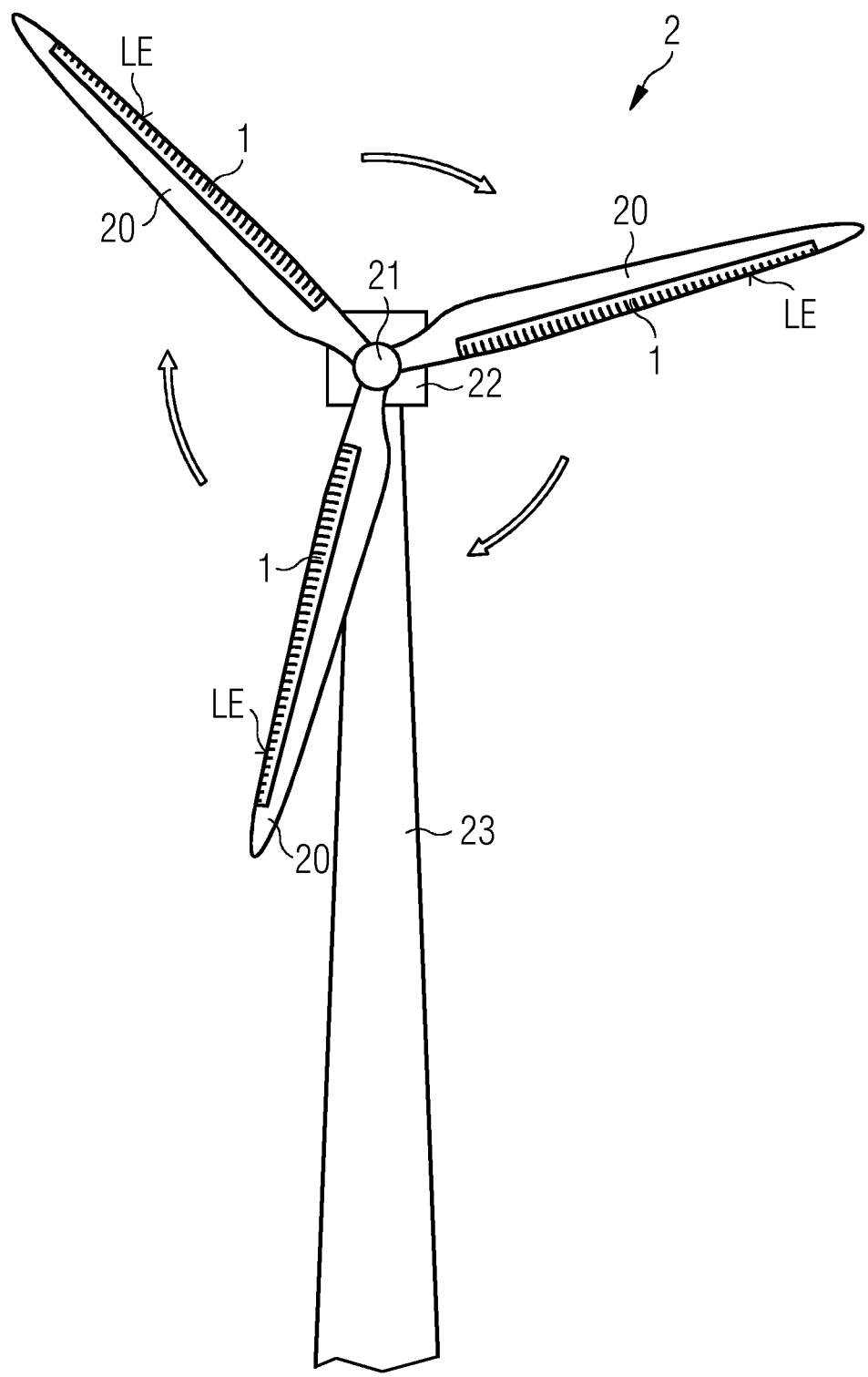
FIG. 3 shows a wind turbine.

FIG. 3 shows a wind turbine 2 with a number of rotor blades 20 mounted to a hub 21 that turns a component of a generator housed in a nacelle 22. The nacelle 22 is mounted on a tower 23, which can be located at an onshore or offshore site. The inventive LEP can be used along the entire leading edge LE of each rotor blade 20, or along a suitable fraction such as indicated here. As explained above, suitable parameters such as fin spacing, fin width, fin height etc. may be identified with the help of simulations, wind tunnel testing techniques, etc. for that specific type of rotor blade 20.

Figure 4:
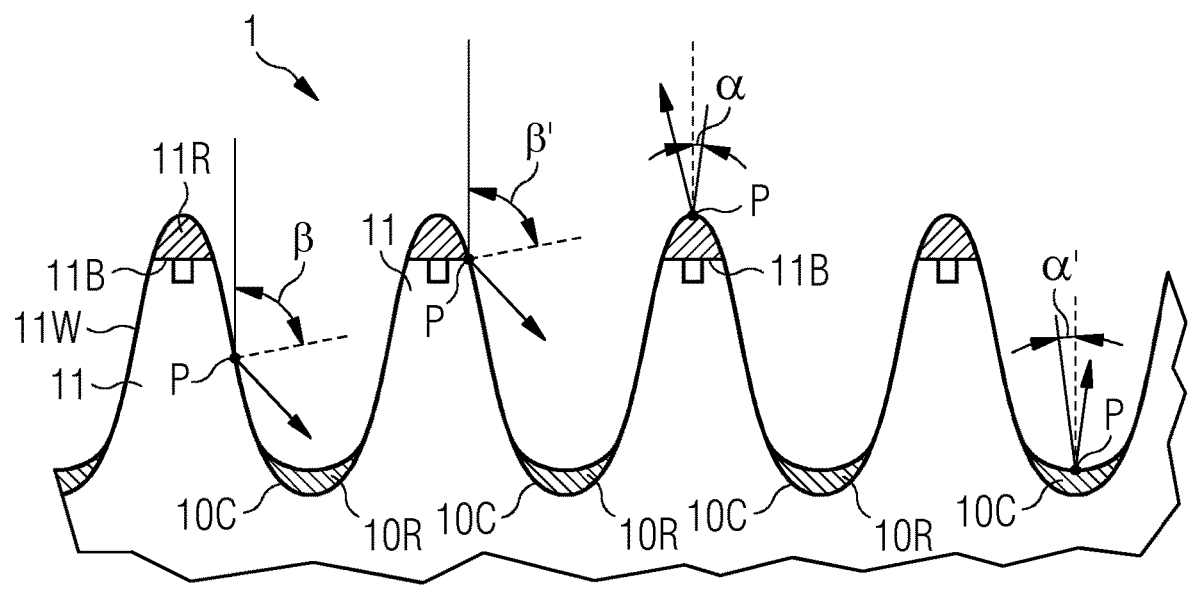
FIG. 4 illustrates an effect of the leading edge protector.

FIG. 4 shows exemplary shapes for the LEP reinforcement, showing a preferred convex shape of the outer reinforcement bands 11R and a preferred concave shape of the inner reinforcement bands 10R. The diagram also illustrates the beneficial effect of the inventive LEP 1, showing exemplary impacts by particles P such as hailstones or sand grains, relative to a normal to the surface at the point of impact. Any particle P that impinges on the steep side face 11W of a fin 11 will be deflected safely, thereby losing speed. In the two exemplary situations on the left-hand-side, the obtuse angle of impact β, β' relative to the normal means that the force of impact is negligible, or at least so low as to not cause any significant damage. In the two exemplary situations on the right-hand-side, a particle P impinges on the LEP 1 at an acute angle of impact α, α' relative to the normal. However, the vulnerable blunt faces 11B of the fins 11 and the vulnerable channels 10C between fins 11 are protected by reinforcing bands 11R, 10R which are constructed to absorb the force of impact to a large extent.

Figure 5:
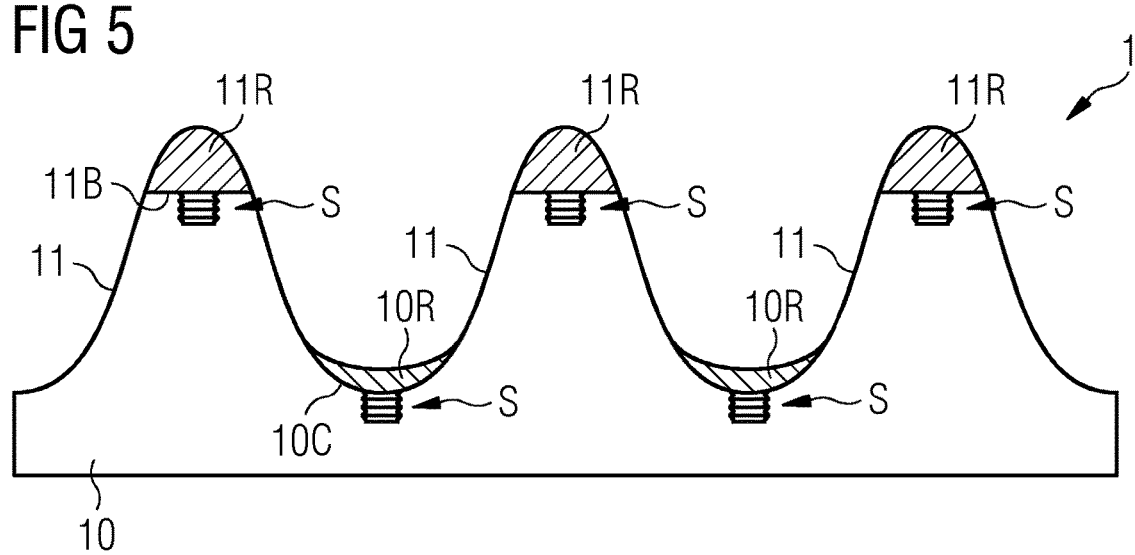
FIG. 5 shows reinforcing bands in an embodiment of the leading edge protector.
Figure 6:
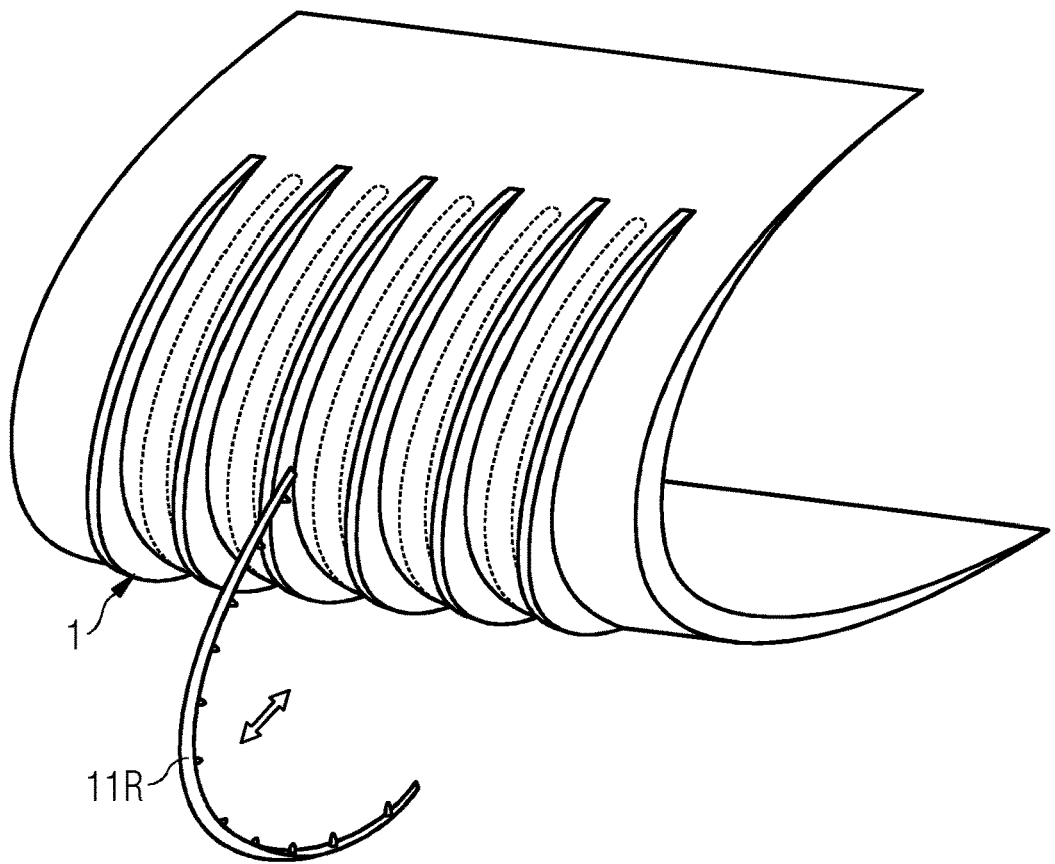
FIG. 6 shows reinforcing bands in an embodiment of the leading edge protector.

Exemplary embodiments of the reinforcing bands 11R, 10R are shown in more detail in FIG. 5. The drawing also shows a press-stud connection S between a reinforcing band 11R and a fin 11, and between a reinforcing band 10R and a channel 10C between fins 11. The press-studs allow the reinforcing bands 11R, 10R to be mounted with relative ease, and also to be removed with little difficulty, as indicated in FIG. 6 (for the sake of clarity, the openings for the press-studs are not shown).

Figure 7:
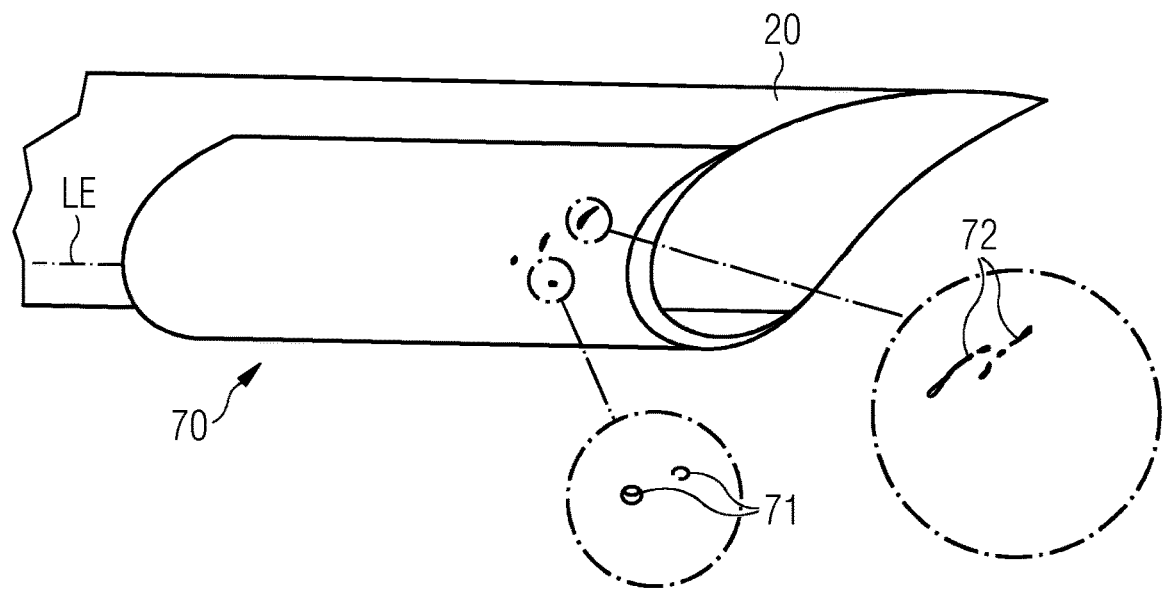
FIG. 7 shows a conventional leading edge protector.

FIG. 7 shows a prior art LEP 70 for mounting over the leading edge LE of a rotor blade 20. While the prior art LEP 70 can prevent the rotor blade 20 from damage in the leading edge region, the protector 70 will be damaged by erosion or pitting, as shown in the enlarged image portions. These illustrate pitting 71 and gouging 72 as a result of high-speed impact from particles such as hailstones or sand.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A leading-edge protector for a wind turbine rotor blade, comprising:
    a curved body shaped for attachment to the wind turbine rotor blade along at least a section of a leading edge;
    a plurality of fins, each fin extending radially outward from the curved body and terminating in a blunt outer face; and
    a plurality of reinforcement bands, wherein a reinforcement band is attached to the blunt outer face of the fin and curves around the leading edge of the wind turbine rotor blade on top of the blunt outer face of the fin.

2. The leading-edge protector according to claim 1, wherein the fin comprises two side faces, each side face extending from the blunt outer face to the curved body, and wherein an angle subtended by a side face to the normal comprises at most 30°.

3. The leading-edge protector according to claim 1, wherein a ratio of fin height to mean fin width is at least 3:1.

4. The leading-edge protector according to claim 1, wherein a reinforcement band is shaped as a continuation of the fin.

5. The leading-edge protector according to claim 1, wherein the fin has a form of an arc, and wherein a tip-to-tip span of the fin does not exceed a maximum thickness of a rotor blade airfoil at that position.

6. The leading-edge protector according to claim 1, wherein the fin comprises tapered outer ends.

7. The leading-edge protector according to claim 1, comprising a plurality of inner reinforcement bands, wherein an inner reinforcement band is arranged between two adjacent fins and extends about the curved body.

8. The leading-edge protector according to claim 1, wherein the fins and/or the curved body are made of a polyurethane based elastomer.

9. The leading-edge protector according to claim 1, wherein the plurality of reinforcement bands are made of polycarbonate plastic.

10. A wind turbine comprising a number of rotor blades, wherein a rotor blade is equipped with the leading-edge protector according to claim 1.

11. A method of manufacturing the leading-edge protector according to claim 1, of the method comprising:

forming the curved body for attachment to a wind turbine rotor blade along at least a section of the leading edge;

forming the plurality of fins to extend radially outward from the curved body, each fin terminating in the blunt outer face;

attaching the plurality of inner reinforcement bands to the curved body between the plurality of fins; and/or attaching a plurality of outer reinforcement bands to the blunt outer faces of the plurality of fins.

12. The method according to claim 11, further comprising forming a number of recesses along the blunt outer face of a fin and/or along the curved body between adjacent fins, wherein a recess is formed to receive a fastener extending from an underside of a reinforcement band.

13. The method according to claim 11, wherein the attaching the plurality of reinforcement bands is done by applying pressure to push a fastener into a corresponding recess to form a press-stud connection.

14. The method according to claim 13, wherein a reinforcement band is constructed to allow detachment by pulling to release the fasteners from the corresponding recess.

15. The method according to claim 11, wherein the curved body and the plurality of fins are molded as one piece.

* * * * *